G. MELLEN.
PROCESS FOR PRODUCING ALUMINUM FROM CLAY, KAOLIN, AND OTHER ALUMINUM SILICATES.
APPLICATION FILED AUG. 27, 1912.
1,160,431.
Patented Nov. 16, 1915.
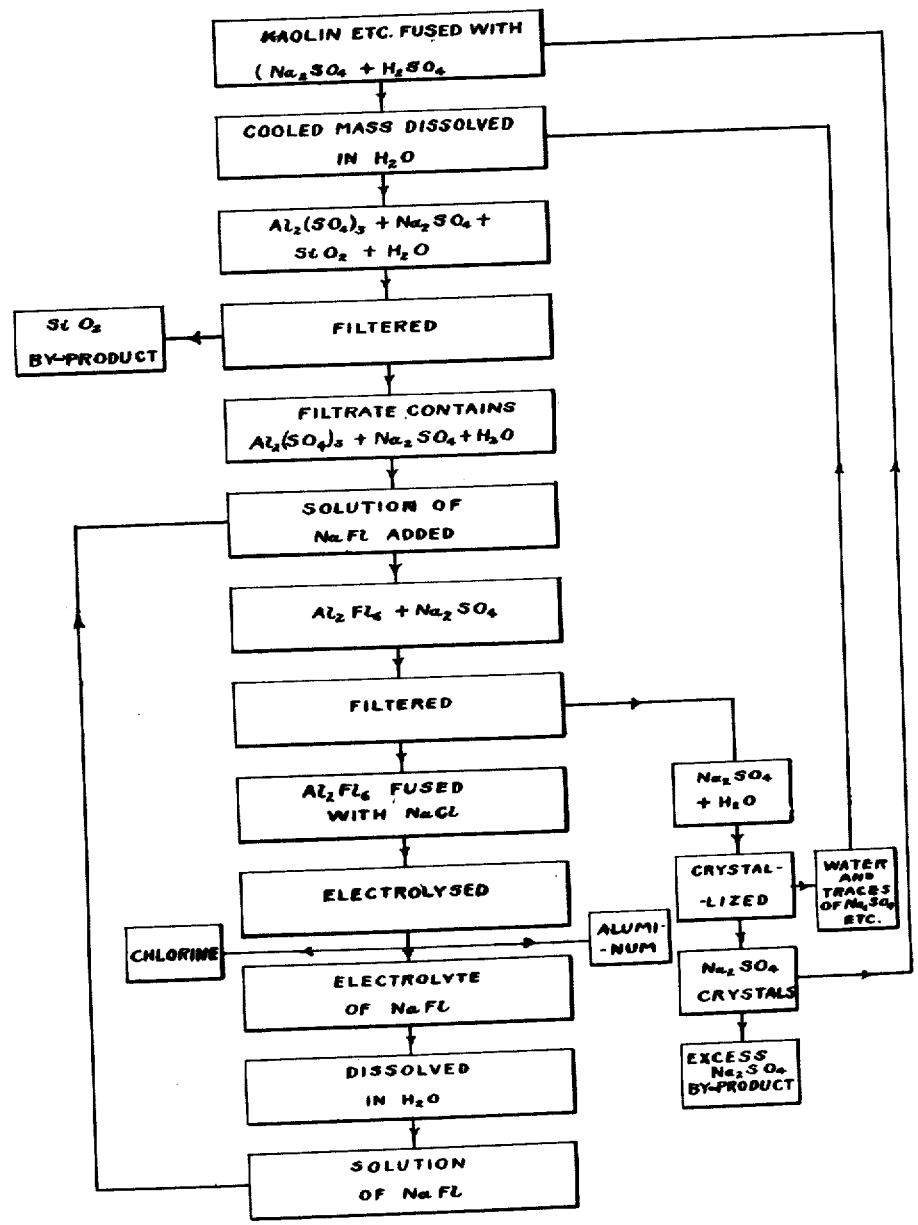

UNITED STATES PATENT OFFICE.

GRENVILLE MELLEN, OF EAST ORANGE, NEW JERSEY, ASSIGNOR OF ONE-HALF TO UNITED ALUMINUM INGOT COMPANY, A CORPORATION OF NEW YORK.

PROCESS FOR PRODUCING ALUMINUM FROM CLAY, KAOLIN, AND OTHER ALUMINUM SILICATES.

1,160,431.  Specification of Letters Patent.  Patented Nov. 16, 1915.

Application filed August 27, 1912. Serial No. 717,353.

*To all whom it may concern:*

Be it known that I, GRENVILLE MELLEN, a citizen of the United States, residing at East Orange, in the county of Essex and State of New Jersey, have invented certain new and useful Improvements in Processes for Producing Aluminum from Clay, Kaolin, and other Aluminum Silicates, of which the following is a specification.

My invention relates to a process of treating clays, kaolin, and other aluminum silicates, for the purpose of obtaining aluminum, by reacting upon said clays, etc., with suitable reagents, and obtaining intermediate products which are continually reused; by-products, and metallic aluminum.

The process is also applicable for the production of metals similar to aluminum, from their silicates.

The accompanying drawing illustrates diagrammatically the several steps of the process.

The clay, kaolin, etc., is fused with sodium sulfate and sulfuric acid, or with its equivalent of sodium bi-sulfate, ($NaHSO_4$) in such proportions as to form aluminum sulfate, and free silica; in the former case the sodium sulfate combining with the sulfuric acid, on heating, forming sodium acid sulfate, ($NaHSO_4$), which when molten serves as a flux and decomposes the clay, kaolin, etc., fused therewith. After the reaction is completed, the mass is cooled, and dissolved in hot water, or in a hot dilute aqueous solution of sodium sulfate, containing a small quantity of aluminum salts from a prior extraction. The hot solution thus obtained has an acid reaction, due to sulfuric acid, and to the acid reaction of aluminum sulfate solutions, and is filtered to remove silica and any other insoluble matter contained therein. The filtered solution is concentrated if necessary, and a concentrated sodium fluorid solution is added thereto, with stirring. This solution is allowed to cool, when an aluminum fluorid precipitate will separate out. This aluminum fluorid is difficultly soluble, and is separated by filtration; the filtrate containing sodium sulfate is concentrated to crystallize out of the sodium sulfate, some of which may be used, with fresh sulfuric acid, to fuse additional clay, etc., or the equivalent of sodium acid sulfate, may be substituted, as above described. The filtrate from the sodium sulfate crystals is used to dissolve the mass resulting from the fusion of clay, sodium sulfate and sulfuric acid, as above described.

The aluminum fluorid is suitably fused with a suitable alkaline haloid salt, such as sodium chlorid, and electrolyzed, setting free chlorin at the anode, aluminum at the cathode, and producing sodium fluorid. After the electrolysis has been carried as far as is deemed practicable, the fused mass of sodium fluorid, which may contain some sodium chlorid and some aluminum fluorid, is tapped off, and allowed to cool; it may then be used to precipitate aluminum fluorid from the aluminum sulfate-sodium sulfate solution, as above described. The metallic aluminum remaining from the electrolysis is tapped off and cast into ingots.

The halogen, as in the instance described, chlorin, is separated by electrolysis from the sodium chlorid, and collected in any suitable manner.

The by-products from the process, using, for example, sodium chlorid, are highly pure silica obtained in the first step of the process,—chlorin obtained by electrolysis, and sodium sulfate.

The intermediate products, sodium sulfate, and sodium fluorid, are continually reused.

The new materials required are clay, sulfuric acid, and sodium chlorid.

I may separately fuse the sodium sulfate and sulfuric acid to form sodium acid sulfate, and fuse the clay with this salt; or I may obtain sodium acid sulfate from outside sources, and use it direct.

The ordinary chemical equivalents of the salts used, such as potassium salts, etc., are intended to be included by the term "sodium" where used; the sodium salts are preferred for commercial reasons. In lieu of chlorid salts, bromids or iodids may be used where practicable.

I claim:

The cyclic process, which consists in fusing clay with sodium sulfate and sulfuric acid, dissolving and filtering the product, the filtrate comprising a mixture of aluminum sulfate and sodium sulfate, adding thereto a solution of sodium fluorid and thereby precipitating aluminum fluorid; then filtering off the sodium sulfate, crystallizing and using the product in the first step of a succeeding operation; fusing the precipitate aluminum fluorid with a sodium salt, electrolyzing the fused mass to deposit aluminum, and reusing the exhausted sodium-fluorid-containing electrolyte to form fresh aluminum fluorid.

In testimony whereof I affix my signature in presence of two witnesses.

GRENVILLE MELLEN.

Witnesses:
J. W. HARRIS,
E. C. TATE.

It is hereby certified that in Letters Patent No. 1,160,431, granted November 16, 1915, upon the application of Grenville Mellen, of East Orange, New Jersey, for an improvement in "Processes for Producing Aluminum from Clay, Kaolin, and other Aluminum Silicates," an error appears in the printed specification requiring correction as follows: Page 1, line 50, strike out the word "of"; and that the said Letters Patent should be read with this correction therein that the same may conform to the record of the case in the Patent Office.

Signed and sealed this 26th day of June, A. D., 1917.

[SEAL.]

R. F. WHITEHEAD,

*Acting Commissioner of Patents.*

Cl. 204—207.